United States Patent
Urabe et al.

(10) Patent No.: US 12,142,056 B2
(45) Date of Patent: Nov. 12, 2024

(54) INFORMATION PROCESSING DEVICE, INFORMATION PROCESSING METHOD, AND COMPUTER READABLE MEDIUM FOR DETERMINING A LATENT EVENT

(71) Applicant: Mitsubishi Electric Corporation, Tokyo (JP)

(72) Inventors: Tatsuya Urabe, Tokyo (JP); Naoyuki Tsushima, Tokyo (JP); Yi Jing, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1123 days.

(21) Appl. No.: 16/970,521

(22) PCT Filed: Mar. 26, 2018

(86) PCT No.: PCT/JP2018/012220
§ 371 (c)(1),
(2) Date: Aug. 17, 2020

(87) PCT Pub. No.: WO2019/186664
PCT Pub. Date: Oct. 3, 2019

(65) Prior Publication Data
US 2021/0012121 A1   Jan. 14, 2021

(51) Int. Cl.
*G06K 9/62* (2022.01)
*B60W 30/09* (2012.01)
(Continued)

(52) U.S. Cl.
CPC ............. *G06V 20/58* (2022.01); *B60W 30/09* (2013.01); *B60W 30/0956* (2013.01);
(Continued)

(58) Field of Classification Search
CPC ...... G06T 7/20–7/292; G08G 1/0968–1/0969; G08G 1/16–1/168;
(Continued)

(56) References Cited

U.S. PATENT DOCUMENTS 8,634,980 B1   1/2014   Urmson et al.
8,688,306 B1   4/2014   Nemec et al.
(Continued)

FOREIGN PATENT DOCUMENTS

CN         106427998 A      2/2017
DE   10 2009 019 702 A1   11/2009
(Continued)

OTHER PUBLICATIONS

Screen captures from YouTube video clip titled "Car brakes suddenly in front of HGV," 16 pages, uploaded on Aug. 13, 2014 by user "Dash Cam Network". Retrieved from Internet: https://www.youtube.com/watch?v=ZORTiNA5sfA. (Year: 2014).*
(Continued)

*Primary Examiner* — Brian Werner
(74) *Attorney, Agent, or Firm* — Birch, Stewart, Kolasch & Birch, LLP (57) ABSTRACT

An object recognition unit (200) recognizes an object existing around a moving body (100). A surrounding situation estimation unit (204) analyzes at least any of a position and behavior of the object recognized by the object recognition unit (200), and derives as a latent event, an event which is likely to surface later and is attributed to an object that the object recognition unit (200) has not been able to recognize to exist around the moving body (100).

9 Claims, 10 Drawing Sheets

(51) Int. Cl.
  *B60W 30/095* (2012.01)
  *G06V 20/58* (2022.01)
  *G06V 40/20* (2022.01)
  *G08G 1/16* (2006.01)
  *B60W 60/00* (2020.01)

(52) U.S. Cl.
  CPC ............ *G06V 20/584* (2022.01); *G06V 40/20* (2022.01); *G08G 1/166* (2013.01); *B60W 60/0027* (2020.02); *B60W 2420/403* (2013.01); *B60W 2420/408* (2024.01)

(58) Field of Classification Search
  CPC .... G08G 1/166; G05D 1/0246–1/0253; G05D 1/0088; G06V 20/56–20/588; B60W 30/08–30/0956; B60W 30/09; B60W 60/0027–60/00276
  See application file for complete search history.

(56) References Cited

U.S. PATENT DOCUMENTS

| | | | |
|---|---|---|---|
| 8,965,621 | B1 | 2/2015 | Urmson et al. |
| 9,120,484 | B1 | 9/2015 | Ferguson et al. |
| 9,122,948 | B1 | 9/2015 | Zhu et al. |
| 9,505,338 | B2* | 11/2016 | Ogasawara ............ H04N 23/73 |
| 9,658,620 | B1 | 5/2017 | Urmson et al. |
| 9,679,191 | B1 | 6/2017 | Zhu et al. |
| 9,911,030 | B1 | 3/2018 | Zhu et al. |
| 10,198,619 | B1 | 2/2019 | Zhu et al. |
| 10,372,129 | B1 | 8/2019 | Urmson et al. |
| 10,572,717 | B1 | 2/2020 | Zhu et al. |
| 2012/0083959 | A1 | 4/2012 | Dolgov et al. |
| 2012/0083960 | A1 | 4/2012 | Zhu et al. |
| 2012/0083964 | A1 | 4/2012 | Montemerlo et al. |
| 2012/0218093 | A1* | 8/2012 | Yoshizawa ............ G08G 1/166 340/435 |
| 2013/0151058 | A1 | 6/2013 | Zagorski et al. |
| 2013/0297140 | A1 | 11/2013 | Montemerlo et al. |
| 2014/0136045 | A1 | 5/2014 | Zhu et al. |
| 2014/0219505 | A1 | 8/2014 | Kindo et al. |
| 2014/0324268 | A1 | 10/2014 | Montemerlo et al. |
| 2015/0211868 | A1 | 7/2015 | Matsushita et al. |
| 2015/0334269 | A1 | 11/2015 | Yokota et al. |
| 2016/0189323 | A1* | 6/2016 | Wakabayashi .......... G06F 18/22 705/325 |
| 2017/0185853 | A1 | 6/2017 | Yokota et al. |
| 2017/0269201 | A1 | 9/2017 | Adachi et al. |
| 2018/0162394 | A1* | 6/2018 | Kamiya ............ B60W 30/0953 |
| 2018/0182245 | A1 | 6/2018 | Takabayashi et al. |
| 2020/0283030 | A1* | 9/2020 | Raichelgauz .......... G08G 1/165 |

FOREIGN PATENT DOCUMENTS

| | | |
|---|---|---|
| DE | 102012222301 A1 | 6/2013 |
| DE | 102014224762 A1 | 6/2016 |
| DE | 102015208530 A1 | 11/2016 |
| DE | 102016014366 A1 | 7/2017 |
| DE | 102016215115 A1 | 2/2018 |
| JP | 2003-296870 A | 10/2003 |
| JP | 2012-141740 A | 7/2012 |
| JP | 2013-544696 A | 12/2013 |
| JP | 2015-205640 A | 11/2015 |
| JP | 2016-1464 A | 1/2016 |
| JP | 2016-5294 A | 1/2016 |
| JP | 2016-30542 A | 3/2016 |
| JP | 2017-166966 A | 9/2017 |
| JP | 2017-187848 A | 10/2017 |
| WO | WO 2013/042205 A1 | 3/2013 |
| WO | WO 2014/013985 A1 | 1/2014 |
| WO | WO 2017/002441 A1 | 1/2017 |

OTHER PUBLICATIONS

Chinese Office Action dated Jan. 6, 2022 issued in corresponding Chinese Application No. 201880091481.8 with an English Translation.
German Office Action for German Application No. 112018007130.8, dated Mar. 30, 2023, with an English translation.
German Office Action for German Application No. 112018007130.8, dated Jun. 22, 2021, with English translation.
International Search Report issued in PCT/JP2018/012220 (PCT/ISA/210), Dated Jun. 26, 2018.
Notification of Reasons for Refusal, Office Action for Japanese Application No. 2018-545677, dated Oct. 16, 2018.

* cited by examiner

INFORMATION PROCESSING DEVICE, INFORMATION PROCESSING METHOD, AND COMPUTER READABLE MEDIUM FOR DETERMINING A LATENT EVENT

TECHNICAL FIELD

The present invention relates to an information processing device and the like mounted on a moving body.

BACKGROUND ART

If there is an object that obstructs traveling of an autonomous moving body (for example, an autonomous vehicle), the moving body changes its initial course. More specifically, the moving body calculates a traveling direction and speed of the object from a shape of the object, a point where the object is located, and the like, and changes to a course that can avoid a collision with the object based on a calculation result.

If the object does not satisfy the steady motion behavior, it is difficult to calculate the traveling direction and speed of the object.

Patent Literature 1 discloses a technology for addressing this problem.

More specifically, in Patent Literature 1, a type of an object is determined, and an expected motion and behavior of the object are predicted from the type of the object. Therefore, according to Patent Literature 1, it is possible to select a course in which a collision with the object is avoided, based on the predicted motion and behavior expected of the object.

CITATION LIST

Patent Literature

Patent Literature 1: JP2013-544696 A

SUMMARY OF INVENTION

Technical Problem

In Patent Literature 1, the motion and behavior are predicted based on the type of the object.

However, when there is an object that cannot be recognized due to a blockage, a weather condition, a sensor performance limit, a sensor malfunction, or the like, the technology of Patent Literature 1 cannot determine the type of the unrecognized object.

Therefore, the technology in Patent Literature 1 has a problem that when the unrecognized object exists around the moving body, it is difficult to appropriately deal with the object.

The present invention mainly aims at solving the above problems. More specifically, a main object of the present invention is to obtain a configuration capable of appropriately dealing with the object that exists around the moving body but is not recognized.

Solution to Problem

An information processing device according to the present invention to be mounted on a moving body, the information processing device includes:

an object recognition unit to recognize an object existing around the moving body; and a latent event derivation unit to analyze at least any of a position and behavior of the object recognized by the object recognition unit, and derive as a latent event, an event which is likely to surface later and is attributed to an object that the object recognition unit has not been able to recognize to exist around the moving body.

Advantageous Effects of Invention

In the present invention, an event which is attributed to an object which has not been recognized and which is likely to surface later, is derived as a latent event. Therefore, according to the present invention, by dealing with the latent event, it is possible to appropriately deal with an object that exists around a moving body but is not recognized.

DESCRIPTION OF EMBODIMENTS

Hereinafter, embodiments of the present invention will be described with reference to the drawings. In the following description of the embodiments and the drawings, the same reference numerals indicate the same or corresponding parts.

First Embodiment

*Description of Configuration*

Figure 1:
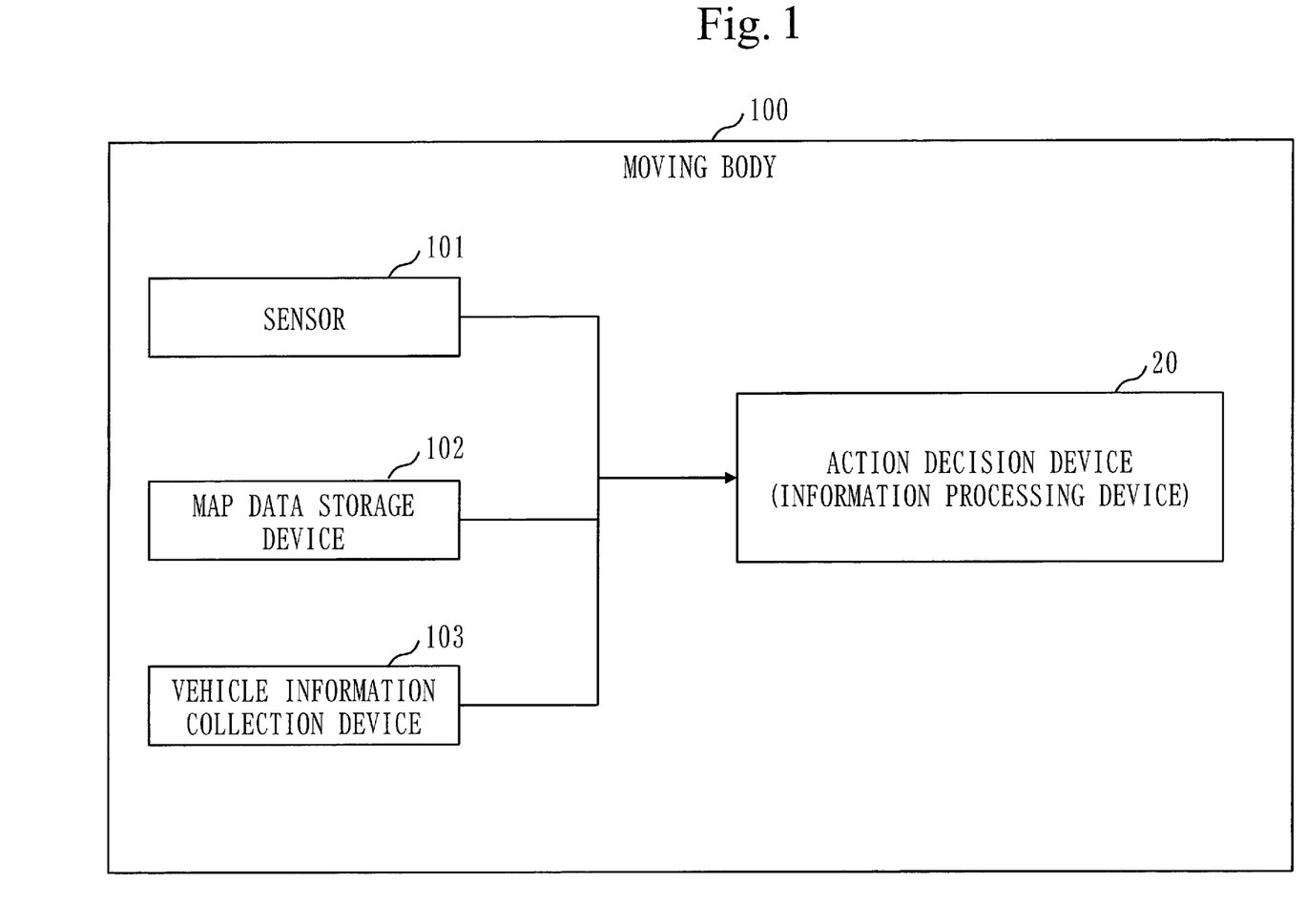
FIG. 1 is a diagram illustrating a configuration example of a moving body according to a first embodiment.

FIG. 1 illustrates a configuration example of a moving body 100 according to the present embodiment.

In the present embodiment, the moving body 100 is a vehicle. The moving body 100 is not limited to a vehicle and may be another type of a moving body such as a ship or a pedestrian. Also, in the present embodiment, since an action decision device 20 is mainly described, FIG. 1 illustrates only elements related to descriptions of the action decision device 20.

The moving body 100 includes a sensor 101, a map data storage device 102, a vehicle information collection device 103, and the action decision device 20.

The sensor 101 obtains sensing data on an object around the moving body 100.

The sensor 101 is, for example, a camera. Also, the sensor 101 may be, for example, a millimeter-wave radar or a LiDAR (Light Detection And Ranging). Besides, in the present embodiment, the sensor 101 is the camera. Therefore, the sensing data that the sensor 101 output is image data.

In FIG. 1, the sensor 101 is mounted on the moving body 100, but the sensor 101 may be provided outside the moving body 100. In this case, it is necessary to provide a communication device in the moving body 100. The communication device receives the sensing data transmitted from the outside.

The map data storage device 102 stores map data.

In FIG. 1, the map data storage device 102 is mounted on the moving body 100, but the map data storage device 102 may be provided outside the moving body 100. In this case, it is necessary to provide a communication device in the moving body 100. The communication device receives the map data transmitted from the outside.

The vehicle information collection device 103 collects information about the moving body 100. For example, the vehicle information collection device 103 collects information on a current position, speed, a traveling direction, and the like of the moving body 100.

The action decision device 20 determines an action of the moving body 100. The action decision device 20 is a computer.

The action decision device 20 corresponds to an information processing device. Also, an operation performed by the action decision device 20 corresponds to an information processing method.

Figure 10:
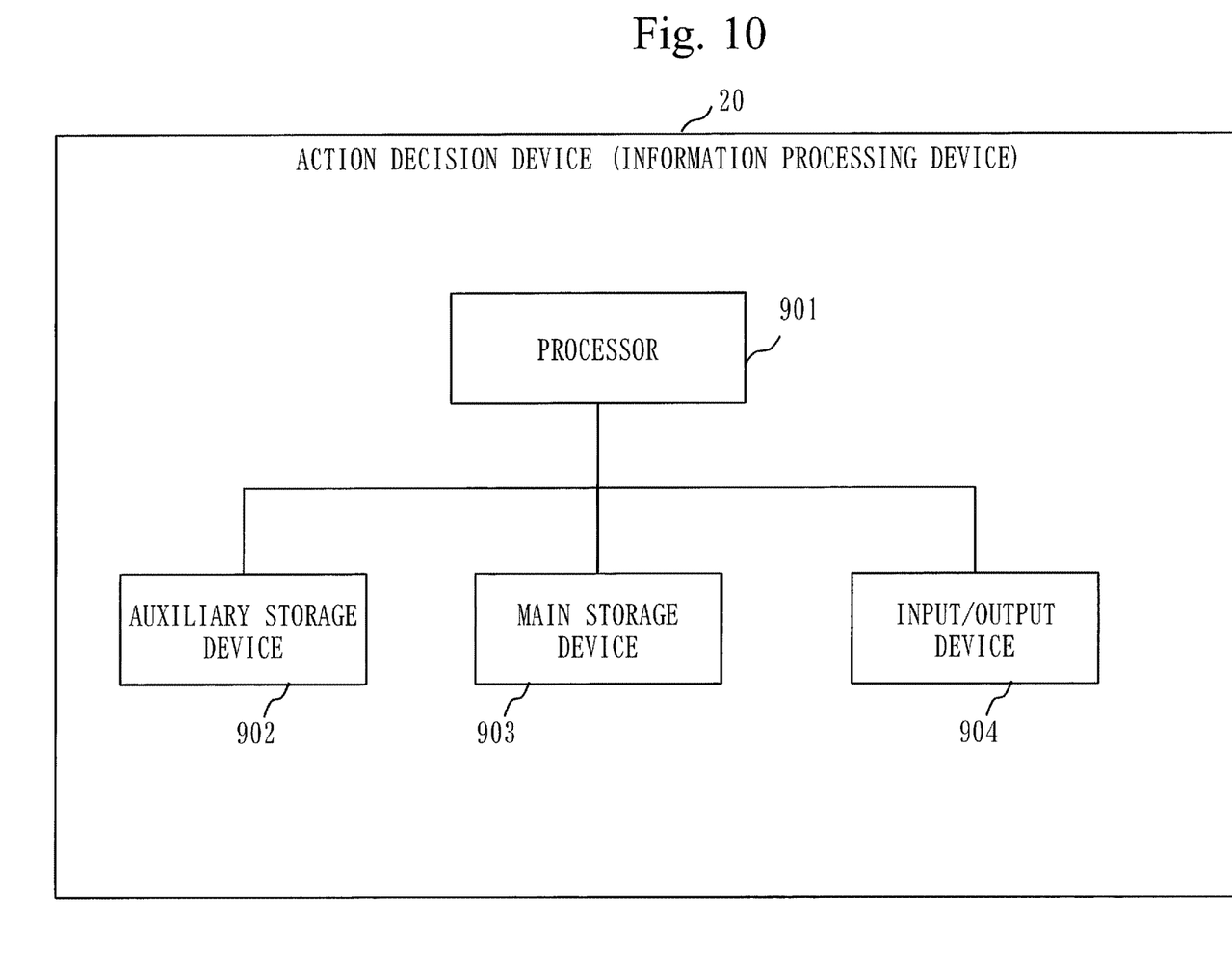
FIG. 10 is a diagram illustrating a hardware configuration example of the action decision device according to the first embodiment.

The action decision device 20 has, for example, a hardware configuration illustrated in FIG. 10.

Figure 2:
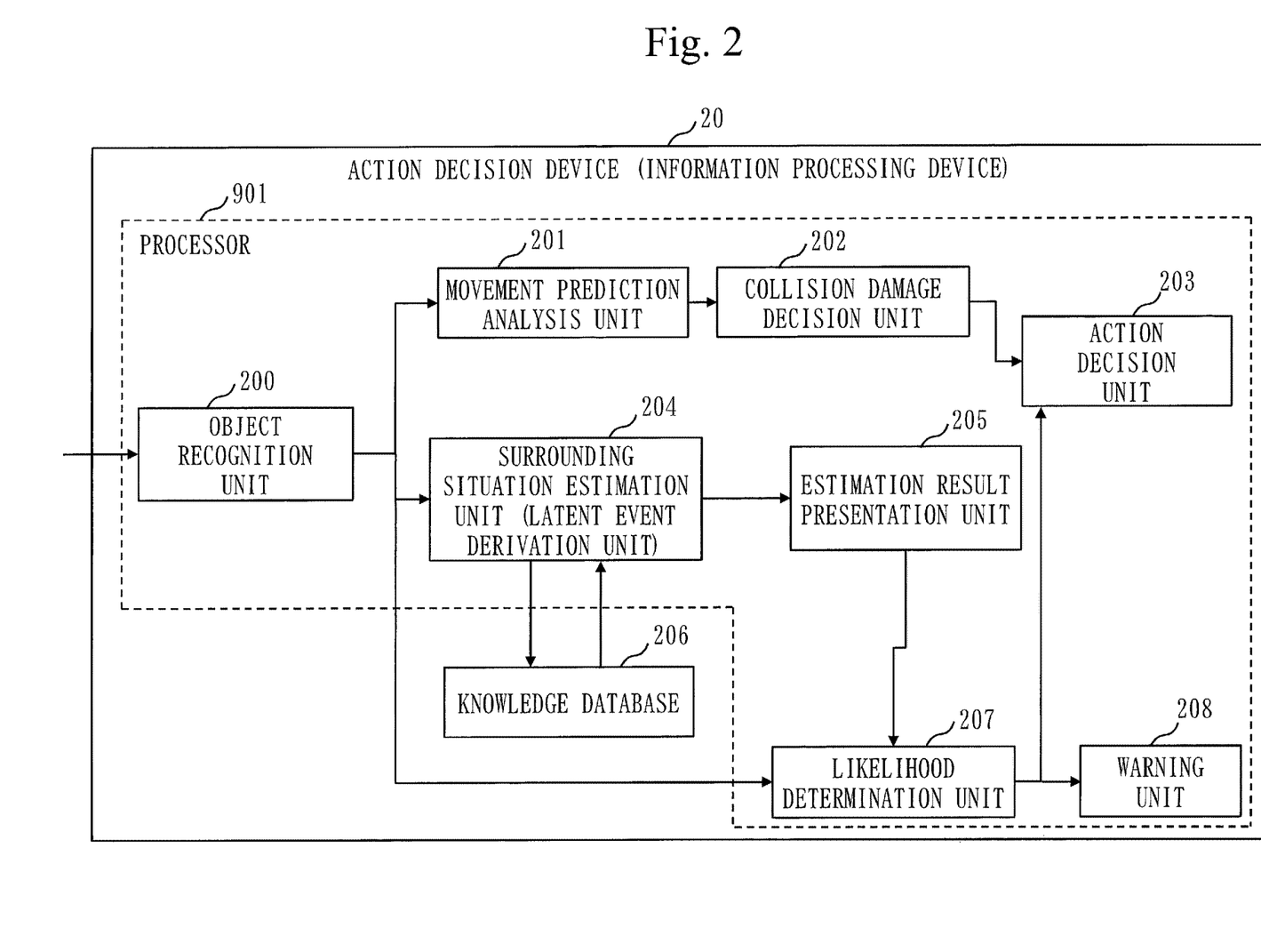
FIG. 2 is a diagram illustrating a functional configuration example of an action decision device according to the first embodiment.

Also, the action decision device 20 has, for example, a functional configuration illustrated in FIG. 2.

First, a hardware configuration example of the action decision device 20 will be described with reference to FIG. 10.

The action decision device 20 includes a processor 901, an auxiliary storage device 902, a main storage device 903, and an input/output device 904 as hardware.

The auxiliary storage device 902 stores a program that implements functions of an object recognition unit 200, a movement prediction analysis unit 201, a collision damage decision unit 202, an action decision unit 203, a surrounding situation estimation unit 204, an estimation result presentation unit 205, a likelihood determination unit 207, and a warning unit 208, illustrated in FIG. 2. The program corresponds to an information processing program.

The program is loaded from the auxiliary storage device 902 to the main storage device 903. Also, the program is read from the main storage device 903 by the processor 901 and executed by the processor 901.

The program that implements the functions of the object recognition unit 200, the movement prediction analysis unit 201, the collision damage decision unit 202, the action decision unit 203, the surrounding situation estimation unit 204, the estimation result presentation unit 205, the likelihood determination unit 207, and the warning unit 208, corresponds to the information processing program.

Also, a knowledge database 206 illustrated in FIG. 2 is implemented by the auxiliary storage device 902 and the main storage device 903.

The input/output device 904 acquires the sensing data from the sensor 101. Also, the input/output device 904 acquires the map data from the map data storage device 102. Also, the input/output device 904 acquires vehicle information from the vehicle information collection device 103.

Next, the functional configuration example of the action decision device 20 will be described with reference to FIG. 2.

The object recognition unit 200 recognizes the object existing around the moving body 100.

More specifically, the object recognition unit 200 acquires the image data which is the sensing data, from the sensor 101 via the input/output device 904. In the image data, the object existing around the moving body 100 is presented. The object recognition unit 200 analyzes the image data and recognizes a type and a size of the object existing around the moving body 100. Further, the image data may present an object (hereinafter, referred to as a reflection object) which is different from the object, reflected on the object due to reflection. In such case, the object recognition unit 200 recognizes a type and a size of the reflection object presented in the image data.

The object recognition unit 200 notifies the movement prediction analysis unit 201, the surrounding situation estimation unit 204, and the likelihood determination unit 207 of a recognition result of the object and a recognition result of the reflection object.

A process performed by the object recognition unit 200 corresponds to an object recognition process.

The movement prediction analysis unit 201 predicts a future movement of the object based on a position and speed of the object.

The collision damage decision unit 202 decides degree of a collision damage when the object collides with the moving body 100, based on a destination of the object predicted by the movement prediction analysis unit 201 and the type and the size of the object recognized by the object recognition unit 200.

The action decision unit 203 refers to the degree of the collision damage decided by the collision damage decision unit 202 and decides the action of the moving body 100 to deal with a latent event derived by the surrounding situation estimation unit 204.

Also, for example, when it is determined by the likelihood determination unit 207 that likelihood that the latent event surfaces later is equal to or greater than a threshold, the action decision unit 203 decides the action of the moving body 100 dealing with the latent event.

The surrounding situation estimation unit 204 estimates surrounding situation of the moving body 100. More specifically, the surrounding situation estimation unit 204 analyzes at least any of the position and behavior of the object recognized by the object recognition unit 200 and derives the latent event. The latent event is an event which is likely to surface later and is attributed to an object that the object recognition unit 200 has not been able to recognize to exist around the moving body 100.

For example, the surrounding situation estimation unit 204 analyzes the behavior of a preceding moving body located in front of the moving body 100. As a result of analyzing the behavior of the preceding moving body, when it is determined that the preceding moving body has decelerated in a situation where deceleration is unnecessary, the surrounding situation estimation unit 204 derives as the latent event, an event that is likely to surface when the moving body reaches the point where the preceding moving body has decelerated. For example, the surrounding situation estimation unit 204 derives as the latent event, an event that the object that the object recognition unit 200 has not been able to recognize to exist around the moving body 100 collides with the moving body 100 when the moving body 100 reaches the point where the preceding moving body has decelerated.

Also, for example, as a result of analyzing the behavior of the preceding moving body, when it is determined that the preceding moving body has taken a risk avoidance action in a situation where the risk avoidance action is unnecessary, the surrounding situation estimation unit 204 derives as the latent event, an event that is likely to surface when the moving body 100 reaches a point where the preceding moving body has taken the risk avoidance action. For example, the surrounding situation estimation unit 204 derives as the latent event, an event that the object that the object recognition unit 200 has not been able to recognize to exist around the moving body collides with the moving body 100 when the moving body reaches the point where the preceding moving body has taken the risk avoidance action.

Besides, the surrounding situation estimation unit 204 corresponds to a latent event derivation unit. Also, a process performed by the surrounding situation estimation unit 204 corresponds to a latent event derivation process.

The estimation result presentation unit 205 aggregates one or a plurality of estimation results obtained from the surrounding situation estimation unit 204, and presents to the likelihood determination unit 207, an estimation result obtained by the aggregation.

That is, the estimation result presentation unit 205 aggregates one or a plurality of latent events derived by the surrounding situation estimation unit 204, and presents to the likelihood determination unit 207, a latent event obtained by the aggregation.

In the knowledge database 206, knowledge for deriving the latent event by the surrounding situation estimation unit 204 is accumulated.

The likelihood determination unit 207 collates the estimation result presented by the estimation result presentation unit 205 with latest information on the object provided by the object recognition unit 200 and determines a probability of the estimation result.

That is, the likelihood determination unit 207 determines the likelihood that the latent event derived by the surrounding situation estimation unit 204 surfaces later.

A process performed by the likelihood determination unit 207 corresponds to a likelihood determination process.

The warning unit 208 warns a driver in the moving body 100 (vehicle) of the latent event when it is determined by the likelihood determination unit 207 that the likelihood that the latent event surfaces later is equal to or greater than a threshold.

As described above, the functions of the object recognition unit 200, the movement prediction analysis unit 201, the collision damage decision unit 202, the action decision unit 203, the surrounding situation estimation unit 204, the estimation result presentation unit 205, the likelihood determination unit 207, and the warning unit 208 are implemented by a program, and the program is executed by the processor 901.

FIG. 2 schematically illustrates a state that the processor 901 executes the program that the object recognition unit 200, the movement prediction analysis unit 201, the collision damage decision unit 202, the action decision unit 203, the surrounding situation estimation unit 204, the estimation result presentation unit 205, the likelihood determination unit 207, and the warning unit 208 are functioned.

*Description of Operation*

Next, with reference to a flowchart illustrated in FIG. 3, an operation example of the action decision device 20 according to the present embodiment will be described.

Also, descriptions will be given with reference to FIGS. 4 to 9 as appropriate.

Figure 4:
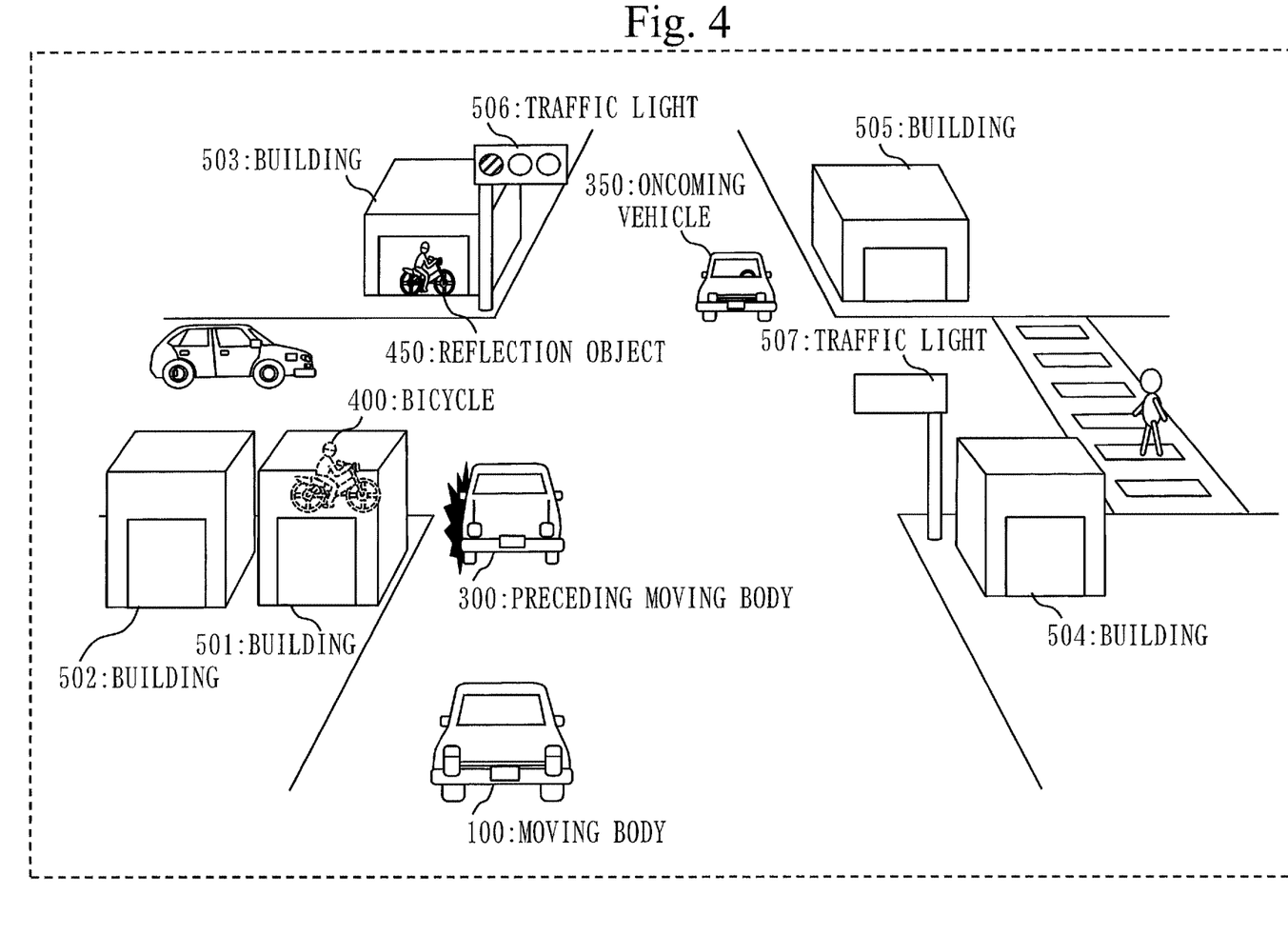
FIG. 4 is a diagram illustrating an example of a situation of an intersection at time $t_{n-1}$ according to the first embodiment.

FIG. 4 illustrates a state where the moving body 100 is traveling toward an intersection.

FIG. 4 illustrates an example of a situation of the intersection at time $t_{n-1}$.

Figure 5:
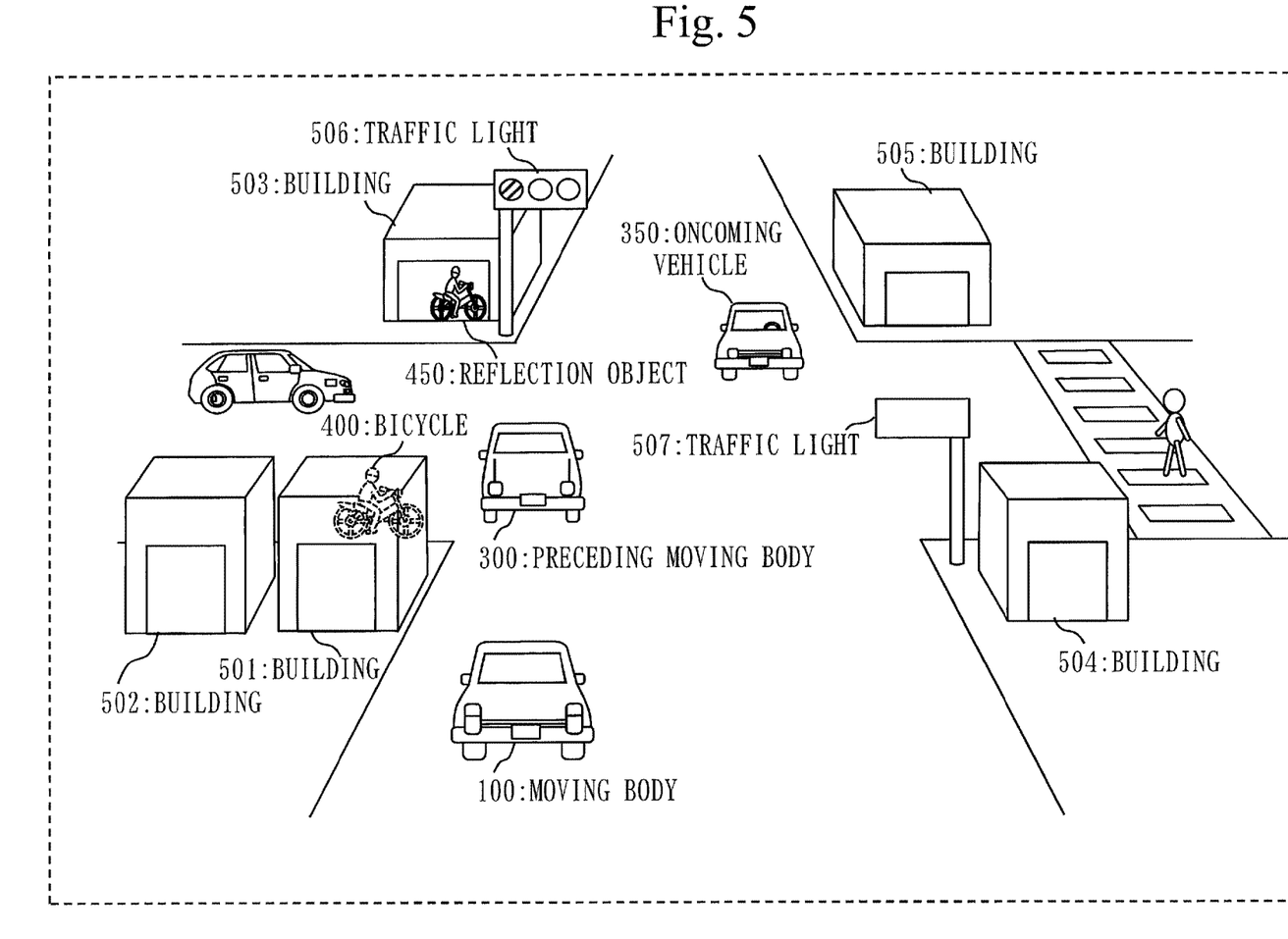
FIG. 5 is a diagram illustrating an example of a situation of the intersection at time $t_n$ according to the first embodiment.

FIG. 5 illustrates an example of a situation of the intersection at time $t_n$.

Figure 6:
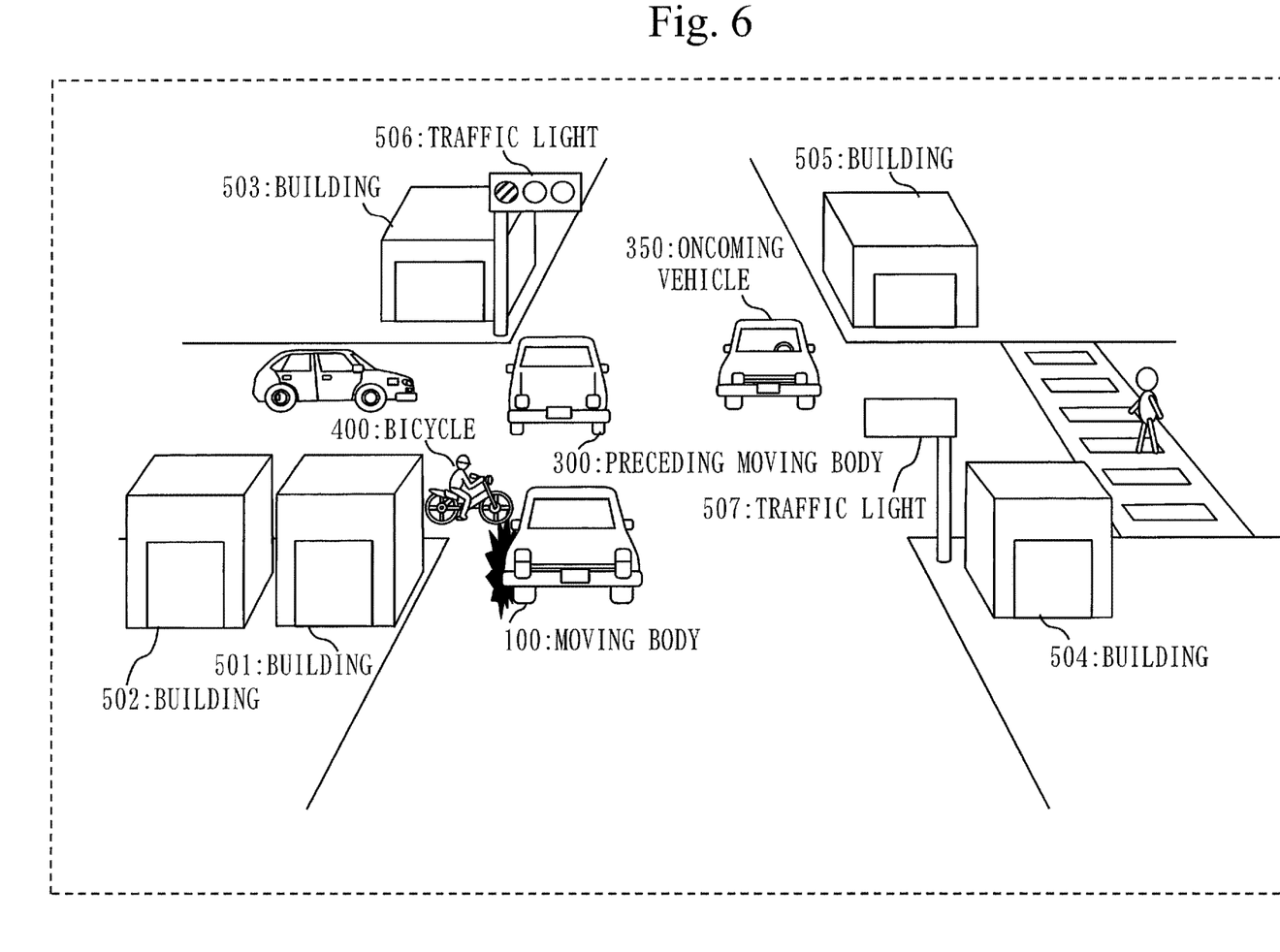
FIG. 6 is a diagram illustrating an example of a latent event at time $t_{n+1}$ according to the first embodiment.

FIG. 6 illustrates an example of the latent event at time $t_{n+1}$.

Figure 7:
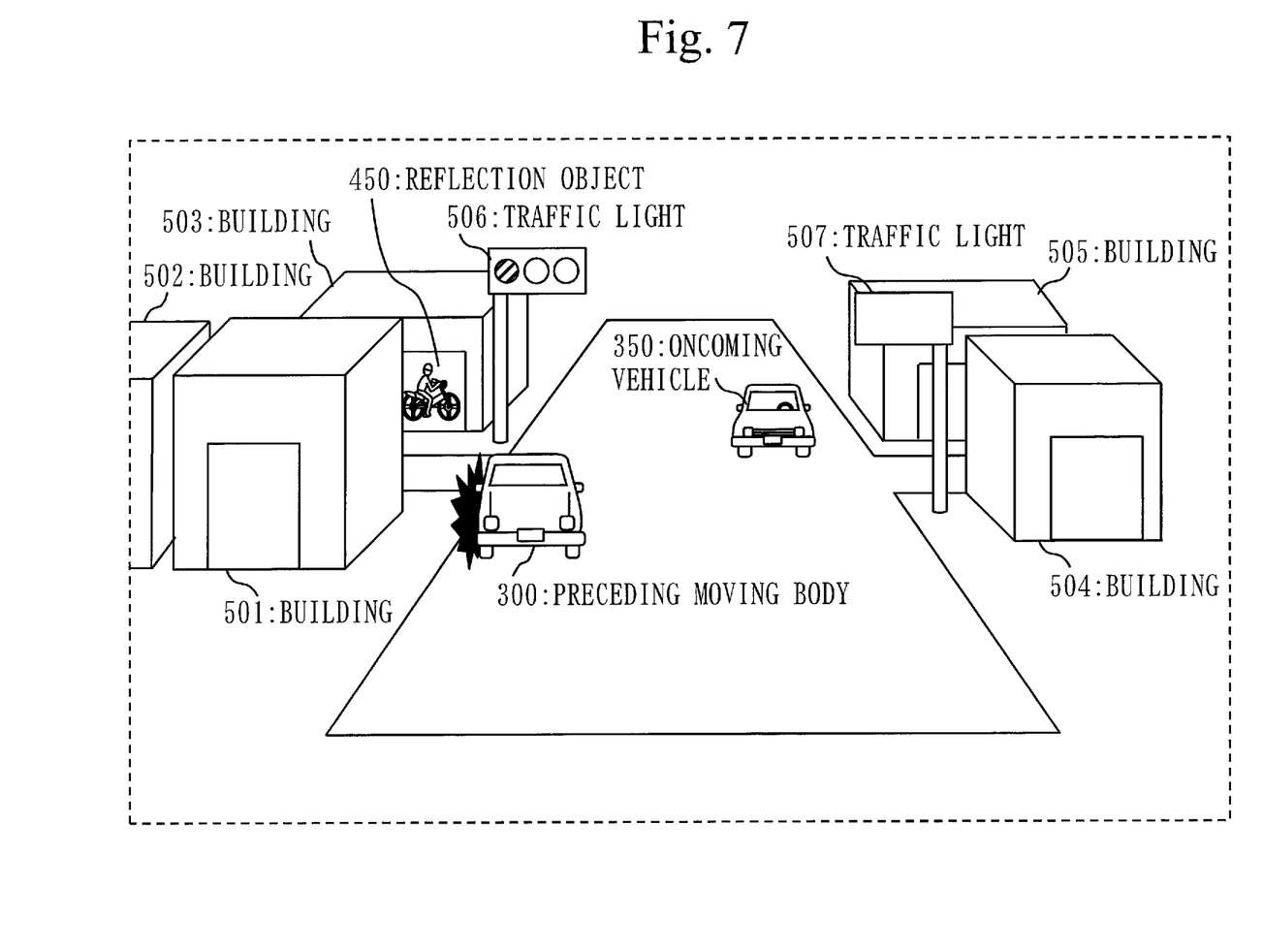
FIG. 7 is a diagram illustrating an example of an image data at time $t_{n-1}$ according to the first embodiment.

FIG. 7 illustrates an example of image data acquired by the sensor 101 of the moving body 100 at time $t_{n-1}$.

Figure 8:
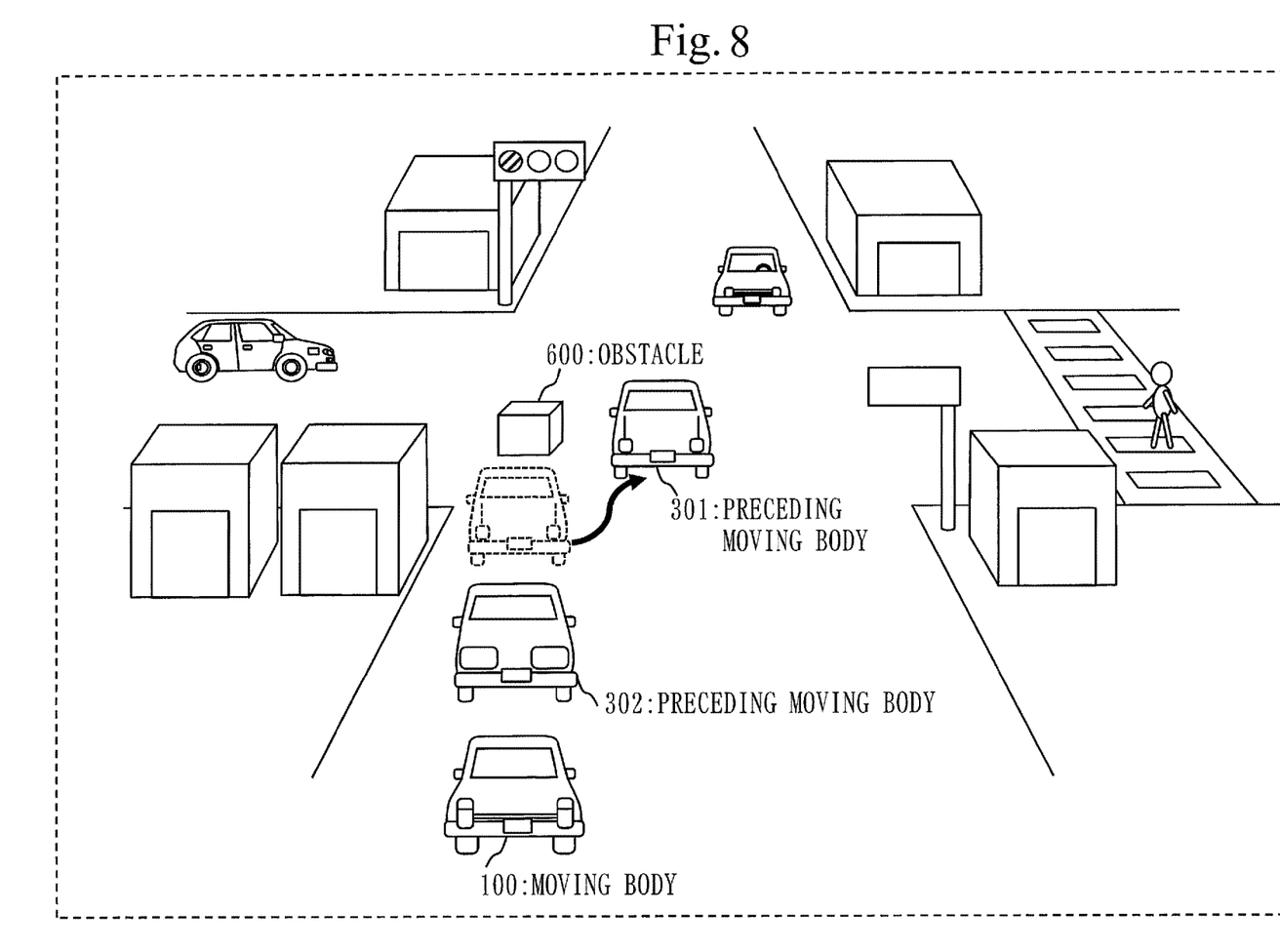
FIG. 8 is a diagram illustrating an example of a situation of the intersection at time $t_{n-1}$ according to the first embodiment.

FIG. 8 illustrates an example of a situation of the intersection at time $t_{n-1}$, which is different from FIG. 4.

Figure 9:
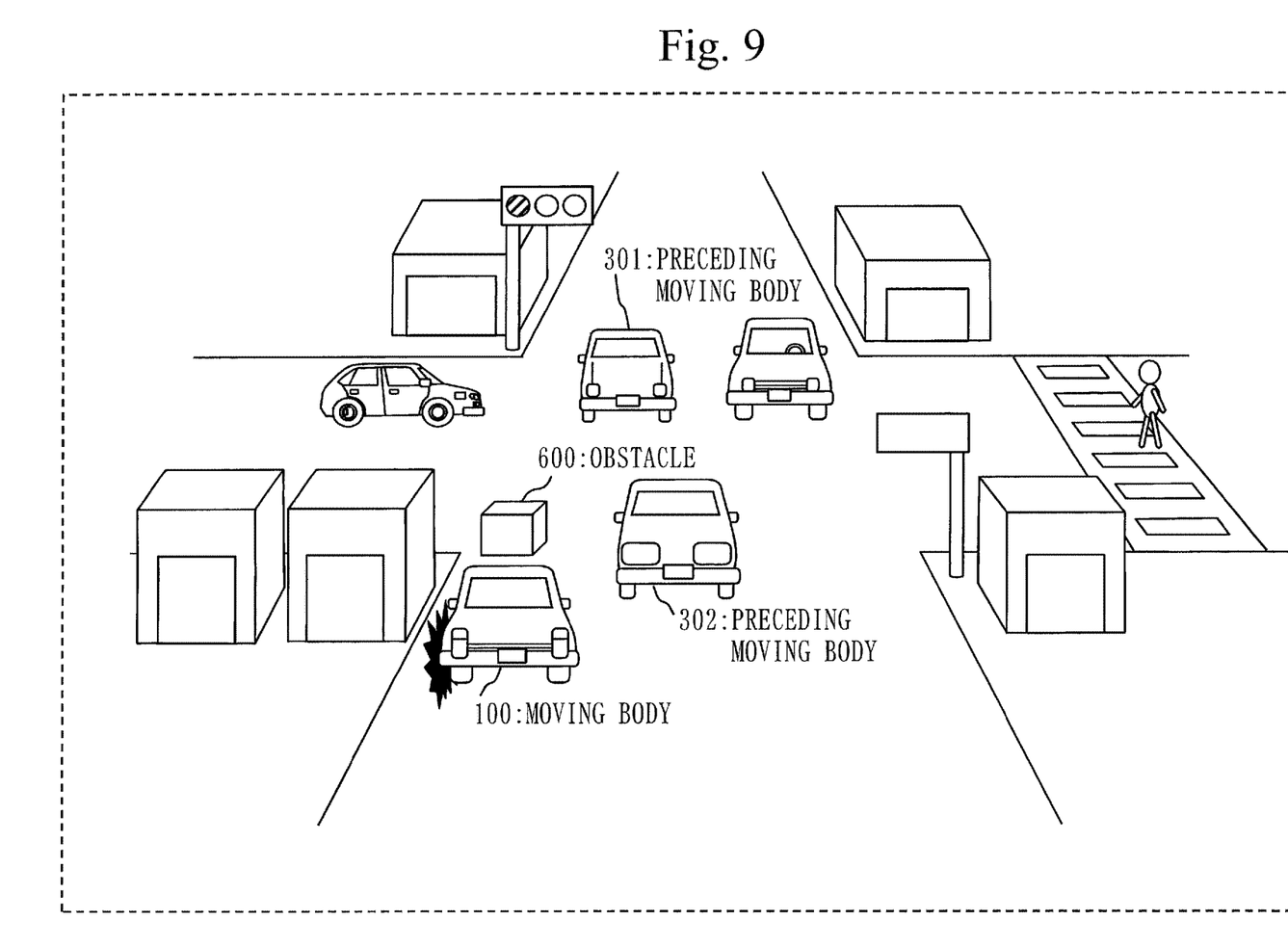
FIG. 9 is a diagram illustrating an example of the latent event at time $t_{n+1}$ according to the first embodiment.

FIG. 9 illustrates an example of the latent event at time $t_{n+1}$, which is different from FIG. 6.

Figure 3:
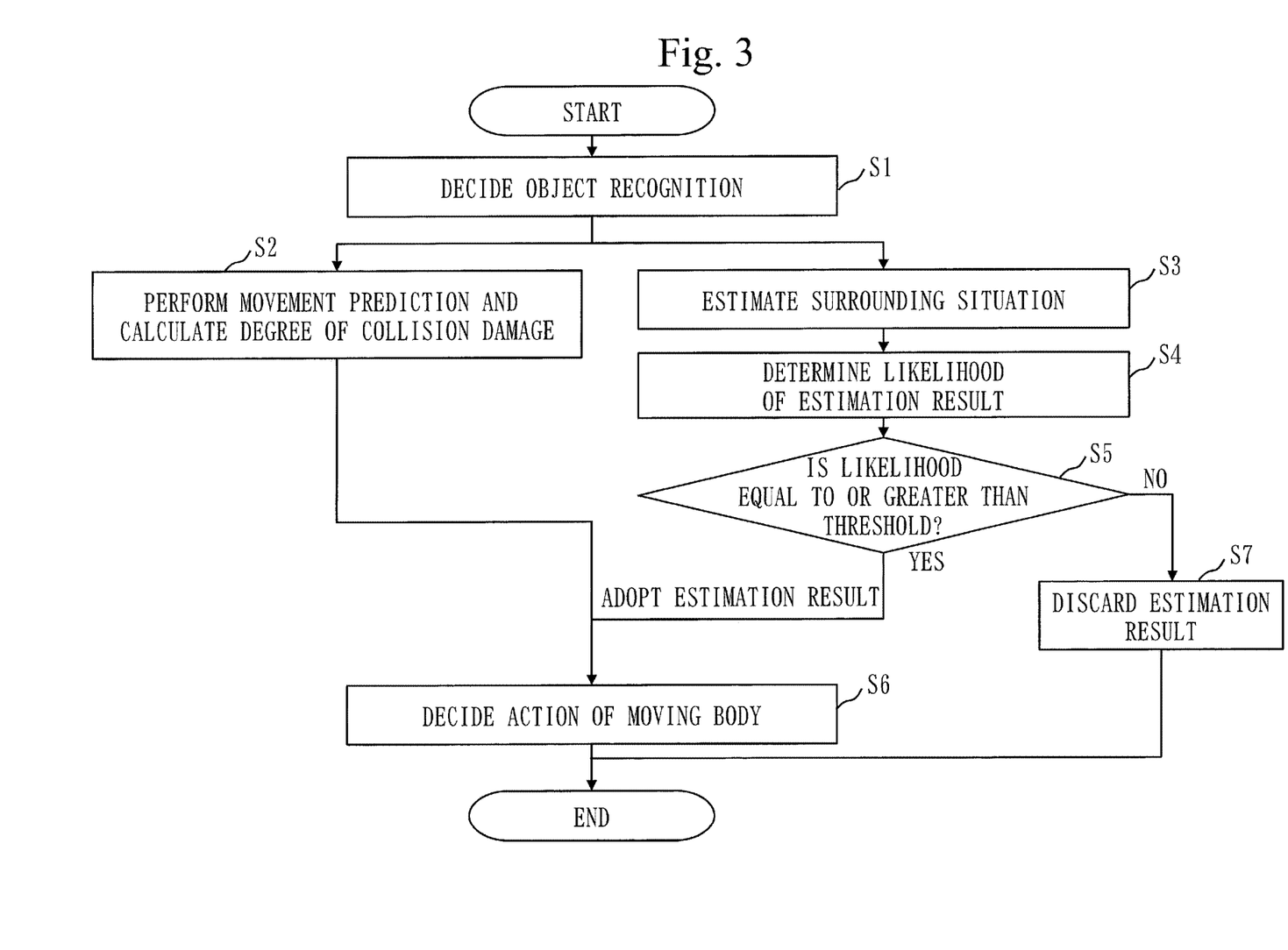
FIG. 3 is a flowchart illustrating an operation example of the action decision device according to the first embodiment.

A flow illustrated in FIG. 3 is executed when the action decision device 20 decides the action of the moving body 100.

In the action decision device 20, when the sensing data, the map data, and the vehicle information are output to the object recognition unit 200, the object recognition unit 200 recognizes the object, and then the action of the moving body 100 is decided using the degree of the collision damage and the estimation result of the surrounding situation.

In step S1, the object recognition unit 200 recognizes the object around the moving body 100 using the sensing data, the map data, and the vehicle information.

In an example of FIG. 4, the moving body 100 is traveling toward the intersection. Also, a preceding moving body 300 is traveling in front of the moving body 100. Further, at the intersection, there is a traffic light 506, and a green light is currently lit against the traveling direction of the moving body 100. Also, there is a bicycle 400 traveling on the right side of the lane, which violates the law, and it is hidden behind a building 501. Also, the bicycle 400 is reflected on a window glass of a building 503 due to reflection. An image of the bicycle 400 reflected on the window glass of the building 503 is referred to as a reflection object 450.

In a state of FIG. 4, the object recognition unit 200 acquires the image data illustrated in FIG. 7 as the sensing data. From the image data in FIG. 7, the object recognition unit 200 recognizes the traffic light 506 and also recognizes that the green light is lit in the traffic light 506. Also, the object recognition unit 200 recognizes the preceding moving body 300 and an oncoming vehicle 350. In addition, the object recognition unit 200 also recognizes the building 501, a building 502, the building 503, a building 504, a building 505, and a traffic light 507. On the other hand, since the bicycle 400 is hidden behind the building 501, the object recognition unit 200 cannot recognize the bicycle 400. However, the object recognition unit 200 can recognize the reflection object 450.

In step S1, the object recognition unit 200 recognizes the object around the moving body 100 using the sensing data, the map data, and the vehicle information.

In an example of FIG. 4, the moving body 100 is traveling toward the intersection. Also, a preceding moving body 300 is traveling in front of the moving body 100. Further, at the intersection, there is a traffic light 506, and a green light is currently lit against the traveling direction of the moving body 100. Also, there is a bicycle 400 traveling on the right side of the lane, which violates the law, and it is hidden behind a building 501. Also, the bicycle 400 is reflected on a window glass of a building 503 due to reflection. An image of the bicycle 400 reflected on the window glass of the building 503 is referred to as a reflection object 450.

In a state of FIG. 4, the object recognition unit 200 acquires the image data illustrated in FIG. 7 as the sensing data. From the image data in FIG. 7, the object recognition unit 200 recognizes the traffic light 506 and also recognizes that the green light is lit in the traffic light 506. Also, the object recognition unit 200 recognizes the preceding moving body 100 and an oncoming vehicle 350. In addition, the object recognition unit 200 also recognizes the building 501, a building 502, the building 503, a building 504, a building 505, and a traffic light 507. On the other hand, since the bicycle 400 is hidden behind the building 501, the object recognition unit 200 cannot recognize the bicycle 400. However, the object recognition unit 200 can recognize the reflection object 450.

In step S2, the movement prediction analysis unit 201 executes a future movement of the object based on the type, size, position, speed, and the like of the object recognized by the object recognition unit 200. Further, the collision damage decision unit 202 determines the degree of the collision damage between the moving body 100 and the object, and a possibility of the collision in traveling of the moving body 100.

In examples of FIGS. 4 and 7, the collision damage decision unit 202 calculates the degree of the collision damage in the traveling direction based on the position and moving speed of the preceding moving body 300, the position and the moving speed of the oncoming vehicle 350, the lane, positional relationship between the buildings 501 to 505, and a lighting state of the traffic light 507. In an example of FIG. 4, the green light is lit at the traffic light 507, and there is no object obstructing the moving body 100. Therefore, the degree of the collision damage when the moving body 100 goes after the preceding moving body 300 and travels straight ahead at the intersection is calculated as low.

Step S3 is executed in parallel with step S2.

In step S3, the surrounding situation estimation unit 204 analyzes at least any of the position and the behavior of the object to estimate the surrounding situation.

That is, the surrounding situation estimation unit 204 analyzes at least any of the position and behavior of the object and derives the latent event.

In examples of FIGS. 4 and 7, when the preceding moving body 300 enters the intersection, a brake light of the preceding moving body 300 is lit, and the surrounding situation estimation unit 204 recognizes that the preceding moving body 300 has rapidly decelerated in a moment. The surrounding situation estimation unit 204 queries the knowledge database 206 about this behavior.

In the knowledge database 206, "a vehicle traveling through a green light at an intersection does not normally decelerate", "stopping at an intersection is prohibited", "an intersection is not a driving end point of a vehicle", and the like are accumulated as knowledge. In addition, the knowledge database 206 also includes knowledge of "an appropriate speed range when traveling straight ahead at an intersection". Besides, in the present embodiment, it is assumed that before the rapid deceleration, the preceding moving body 300 has been traveling at appropriate speed to travel straight ahead at the intersection. Further, the knowledge database 206 also includes knowledge that "to avoid a collision, deceleration or steering in a direction where there is no obstacle is carried out".

The surrounding situation estimation unit 204 collates the knowledge of the knowledge database 206 with the behavior of the preceding moving body 300 and determines that the preceding moving body 300 has decelerated in a situation where deceleration is unnecessary. Then, the surrounding situation estimation unit 204 estimates an event (a latent event) attributed to an object that the object recognition unit 200 has not been able to recognize to exist around the moving body 100. For example, the object which is not recognized by the object recognition unit 200, exists in a blind spot of the intersection, and the surrounding situation estimation unit 204 derives an event attributed to the object.

Also, it is assumed that the knowledge database 206 includes knowledge that "if a vehicle traveling through an intersection of a green light decelerates, an object that causes the deceleration may be reflected on a nearby window glass". In this case, the surrounding situation estimation unit 204 can estimate that an object appearing on the reflection object 450 may be the cause of the rapid deceleration of the preceding moving body 300. Therefore, as illustrated in FIG. 6, the surrounding situation estimation unit 204 can derive a latent event that when the moving body 100 later (for example, at time $t_{n+1}$) reaches the point where the preceding moving body 300 has decelerated, the moving body 100 collides with the object (bicycle 400).

An estimation process by the surrounding situation estimation unit 204 may be a simple rule-based method such as "if . . . then . . . ". Also, the estimation process by the surrounding situation estimation unit 204 may be a logical inference process or may be a machine learning or a statistical method.

Also, the estimation result presentation unit 205 comprehensively interprets a plurality of estimation results from a plurality of behaviors and presents to the likelihood determination unit 207, an estimation result obtained by aggregating the plurality of estimation results.

In step S4, the likelihood determination unit 207 determines the likelihood of the estimation result.

Specifically, the likelihood determination unit 207 collates one or a plurality of estimation results presented by the estimation result presentation unit 205 with the latest recognition result of the object by the object recognition unit 200 and determines the probability of the estimation result.

In examples of FIGS. 4 and 7, at time $t_{n-1}$, the surrounding situation estimation unit 204 derives from the behavior of the preceding moving body 300, a latent event that the moving body 100 will later collide with the object being in the blind spot of the intersection. Also, the surrounding situation estimation unit 204 derives, for the latent event, a possibility of a collision with the object appeared on the reflection object 450 reflected on the window glass of the building 503.

In a situation of the intersection at time $t_n$ illustrated in FIG. 5, since the preceding moving body 300 is traveling straight ahead and it is found that at time $t_{n-1}$, the preceding moving body 300 has not decelerated for a left turn.

The likelihood determination unit 207 calculates, by integrating these, the probability (likelihood) that there exists in the intersection an object (bicycle 400) that the object recognition unit 200 has not been able to recognize. As a measure of the probability (likelihood), for example, a probability that each event occurs simultaneously, that is, a joint probability in statistics, can be used. Also, the likelihood determination unit 207 may use a uniquely defined likelihood function. Also, the likelihood determination unit 207 may determine the probability by referring to a comparison table or database prepared beforehand.

In step S5, if the likelihood calculated in step S4 is equal to or greater than a threshold, the likelihood determination unit 207 determines that the estimation result (the latent event) is probable and decides to adopt the estimation result. Then, the likelihood determination unit 207 outputs the estimation result to the action decision unit 203.

On the other hand, if the calculated likelihood is less than the threshold, the likelihood determination unit 207 determines that the estimation result is incorrect and discards the estimation result in step S7.

In step S6, the action decision unit 203 decides the action of the moving body 100 by integrating the degree of the collision damage output in step S2 and the estimation result output in step S5.

In the examples of FIGS. 4 and 7, according to the degree of collision damage, it is determined that there is no risk of the collision even if the moving body 100 travels straight ahead at the intersection, but according to the estimation situation, a possibility is derived that the object (bicycle 400) comes out of the blind spot and collides with the moving body 100.

For this reason, the action decision unit 203 decides an action such as the moving body 100 reducing the speed or the moving body 100 traveling on the right side in the traveling lane, as an action of the moving body 100 to deal with the estimated situation. By doing so, a safe and efficient traveling can be achieved.

Besides, when the likelihood is equal to or larger than the threshold, the likelihood determination unit 207 may output the estimation result to the warning unit 208, instead of outputting the estimation result to the action decision unit 203 or in parallel with outputting the estimation result to the action decision unit 203.

The warning unit 208 outputs the estimation result (the latent event) to a display panel, a speaker, and the like installed in the moving body 100. For example, the warning unit 208 can display the estimation result on the display panel or make a warning sound from the speaker to warn of the estimation result. For example, the warning unit 208 can notify the driver of a risk of the bicycle 400 coming out of the blind spot at the intersection.

Also, as illustrated in FIG. 8, it is assumed that at time $t_{n-1}$, the surrounding situation estimation unit 204 has recognized that a preceding moving body 301 has taken an action of changing a course to the right without decelerating and lighting a right direction turn signal. In this case, the surrounding situation estimation unit 204 queries the knowledge database 206 for this behavior.

In the knowledge database 206, knowledges that "a vehicle traveling straight ahead through a green light at an intersection does not change a course", "a vehicle traveling straight ahead through a green light at an intersection usually does not light a turn signal", and the like are accumulated. Further, the knowledge database 206 also includes a knowledge that "to avoid a collision, deceleration or steering in a direction where there is no obstacle is carried out".

The surrounding situation estimation unit 204 collates the knowledge of the knowledge database 206 with the behavior of the preceding moving body 301, and determines that the preceding moving body 301 has taken the risk avoidance action, that is, an action for avoiding the obstacle in a situation where the risk avoidance action is unnecessary.

Also, in the knowledge database 206, a knowledge is also included that "when a preceding moving body preceding by n (n≥2) vehicles takes an action to avoid an obstacle, there is a possibility that there exists an obstacle hidden by a preceding moving body which trails".

The surrounding situation estimation unit 204 collates the knowledge of the knowledge database 206 with an obstacle avoidance action of the preceding moving body 301, and estimates an event (a latent event) attributed to an object that the object recognition unit 200 has not been able to recognize to exist around the moving body 100.

For example, as illustrated in FIG. 9, if there is an object (an obstacle 600) hidden by a preceding moving body 302, and the surrounding situation estimation unit 204 can derive the latent event that the moving body 100 collides with the object (the obstacle 600) when the moving body 100 later (for example, time $t_{n+1}$) reaches a point where the preceding moving body 301 has taken the risk avoidance action.

After that, as described above, if it is determined by the likelihood determination unit 207 that the likelihood of the estimation result (the latent event) is equal to or greater than the threshold, the action decision unit 203 decides, in order to avoid collision with the obstacle 600, an action such as the moving body 100 reducing the speed or the moving body 100 traveling on the right lane in the traveling lane.

As described above, even in an example illustrated in FIG. 8, the action decision unit 203 can select an appropriate action based on the estimation result obtained indirectly from the surrounding situation.

Description of Effect of Embodiment

As described above, in the present embodiment, the action decision device 20 derives as the latent event, an event which is likely to surface later and is attributed to an object which has not been recognized. Therefore, according to the present embodiment, by dealing with the latent event, it is possible to appropriately deal with the object that exists around the moving body but has not been recognized.

More specifically, in the present embodiment, the action decision device 20 can extract not only a risk of a collision with a directly recognized object but also a risk of a collision with an object indirectly estimated from a surrounding condition. As a result, according to the present embodiment, it is possible to select the action of the moving body [10] 100, in consideration of even an object that has not been completely recognized, and to enhance safety and efficiency in mobility of an autonomous moving body.

*Description of Hardware Configuration*

Finally, a supplementary description of the hardware configuration of the action decision device 20 will be given.

The processor 901 illustrated in FIG. 10 is IC (Integrated Circuit) that performs processing.

The processor 901 is CPU (Central Processing Unit), DSP (Digital Signal Processor), or the like.

The auxiliary storage device 902 illustrated in FIG. 10 is a ROM (Read Only Memory), a flash memory, an HDD (Hard Disk Drive), or the like.

The main storage device 903 illustrated in FIG. 10 is a RAM (Random Access Memory).

Also, the auxiliary storage device 902 stores an OS (Operating System).

Then, at least a part of the OS is loaded into the main storage device 903 and executed by the processor 901.

The processor 901, while executing at least the part of the OS, executes a program for implementing functions of the object recognition unit 200, the movement prediction analysis unit 201, the collision damage decision unit 202, the action decision unit 203, the surrounding situation estimation unit 204, the estimation result presentation unit 205, and the likelihood determination unit 207 and the warning unit 208.

With the processor 901 executing the OS, task management, memory management, file management, communication control, and the like are performed.

Also, at least any of information, data, signal value, and variable indicating the processing result of the object recognition unit 200, the movement prediction analysis unit 201, the collision damage decision unit 202, the action decision unit 203, the surrounding situation estimation unit 204, the estimation result presentation unit 205, the likelihood determination unit 207, and the warning unit 208 is stored in at least any of the auxiliary storage device 902, the main storage device 903, and a register and cache memory of the processor 901.

Also, a program implementing the functions of the object recognition unit 200, the movement prediction analysis unit 201, the collision damage decision unit 202, the action decision unit 203, the surrounding situation estimation unit 204, the estimation result presentation unit 205, the likelihood determination unit 207, and the warning unit 208 may be recorded on a portable recording medium such as a magnetic disk, a flexible disk, an optical disk, a compact disk, a Blu-ray (registered trademark) disk, and a DVD.

Also, the "unit" of the object recognition unit 200, the movement prediction analysis unit 201, the collision damage decision unit 202, the action decision unit 203, the surrounding situation estimation unit 204, the estimation result presentation unit 205, the likelihood determination unit 207, and the warning unit 208, may be read as "circuit", "step", "procedure" or "process".

Also, the action decision device 20 may be implemented by a processing circuit. The processing circuit is, for example, a logic IC (Integrated Circuit), a GA (Gate Array), an ASIC (Application Specific Integrated Circuit), or an FPGA (Field-Programmable Gate Array).

Besides, in the present specification, a superordinate concept of the processor 901 and the processing circuit is referred to as "processing circuitry".

That is, each of the processor 901 and the processing circuit is a specific example of "processing circuitry".

REFERENCE SIGNS LIST

20: action decision device, 100: moving body, 101: sensor, 102: map data storage device, 103: vehicle information collection device, 200: object recognition unit, 201: movement prediction analysis unit, 202: collision damage decision unit, 203: action decision unit, 204: surrounding situation estimation unit, 205: estimation result presentation unit, 206: knowledge database, 207: likelihood determination unit, 208: warning unit, 300: preceding moving body, 301: preceding moving body, 302: preceding moving body, 350: oncoming vehicle, 400: bicycle, 450: reflection object, 501: building, 502: building, 503: building, 504: building, 505: building, 506: traffic light, 507: traffic light, 600: obstacle, 901: processor, 902: auxiliary storage device, 903: main storage device, 904: input/output device.

The invention claimed is:

1. An information processing device mounted on an autonomous moving body, the information processing device comprising:
   processing circuitry:
   to recognize an object existing around the autonomous moving body, the object including a preceding moving body positioned in front of the autonomous moving body and a traffic light facing the autonomous moving body;
   to predict a future movement of the object and determine a degree of a collision damage between the autonomous moving body and the recognized object, the collision damage being calculated based on a position and moving speed of a preceding moving body and a lighting state of the traffic light;
   to estimate a situation surrounding the autonomous moving body from the recognized object existing around the autonomous moving body, the estimated situation including the preceding moving body has decelerated in a situation where a green light of the traffic light is recognized to be lit;
   to determine likelihood that a latent event will occur from the estimated situation surrounding the autonomous moving body by comparing the likelihood with a threshold, the latent event being an event that has not been able to be recognized by the recognition of the object existing around the autonomous moving body; and
   to determine action of the autonomous moving body by integrating the determined degree of the collision damage and the determined likelihood.

2. The information processing device according to claim 1, wherein
   the processing circuitry determines likelihood that the latent event derived surfaces later.

3. The information processing device according to claim 2, wherein
   the processing circuitry decides an action of the autonomous moving body dealing with the latent event, when it is determined that the likelihood that the latent event surfaces later is equal to or greater than the threshold.

4. The information processing device according to claim 3, wherein
   the processing circuitry decides degree of collision damage caused when the object recognized collides with the autonomous moving body, and
   decides the action of the autonomous moving body dealing with the latent event by referring to the degree of the collision damage decided.

5. The information processing device according to claim 2, wherein
   the processing circuitry warns of the latent event when it is determined that the likelihood that the latent event surfaces later is equal to or greater than the threshold.

6. The information processing device according to claim 1, wherein
   the processing circuitry derives as the latent event, an event that the object that has not been able to be recognized to exist around the autonomous moving body collides with the autonomous moving body when the autonomous moving body reaches the point where the preceding moving body has decelerated.

7. The information processing device according to claim 1 wherein
   the processing circuitry derives the latent event by referring to a knowledge database where a knowledge for deriving the latent event is accumulated.

8. An information processing method by a computer mounted on an autonomous moving body, the information processing method comprising;
   recognizing an object existing around the autonomous moving body, the object including a preceding moving body positioned in front of the autonomous moving body, and a traffic light facing the autonomous moving body;

predicting a future movement of the object and determining a degree of a collision damage between the autonomous moving body and the recognized object, the collision damage being calculated based on a position and moving speed of a preceding moving body and a lighting state of the traffic light;

estimating a situation surrounding the autonomous moving body from the recognized object existing around the autonomous moving body, the estimated situation including the preceding moving body has decelerated in a situation where a green light of the traffic light is recognized to be lit;

determining likelihood that the latent event will occur from the estimated situation surrounding the autonomous moving body by comparing the likelihood with a threshold, the latent event being an event that has not been able to be recognized by the recognition of the object existing around the autonomous moving body; and determining action of the autonomous moving body by integrating the determined degree of the collision damage and the determined likelihood.

9. A non-transitory computer readable medium storing an information processing program which causes a computer mounted on an autonomous moving body to execute:

a recognition process of recognizing an object existing around the autonomous moving body, the object including a preceding moving body positioned in front of the autonomous moving body, and a traffic light facing the autonomous moving body;

a prediction process of predicting a future movement of the object and determine a degree of a collision damage between the autonomous moving body and the recognized object, the collision damage being calculated based on a position and moving speed of a preceding moving body and a lighting state of the traffic light;

an estimation process of estimating a situation surrounding the autonomous moving body from the recognized object existing around the autonomous moving body, the estimated situation including the preceding body has decelerated in a situation where a green light of the traffic light is recognized to be lit;

a determination process of determining likelihood that a latent event will occur from the estimated situation surrounding the autonomous moving body by comparing the likelihood with a threshold, the latent event being an event that has not been able to be recognized by the recognition of the object existing around the autonomous moving body; and a determination process of determining action of the autonomous moving body by integrating the determined degree of the collision and the determined likelihood.

\* \* \* \* \*